(12) United States Patent
Anantharam et al.

(10) Patent No.: US 9,077,624 B2
(45) Date of Patent: Jul. 7, 2015

(54) DIAGNOSTICS IN A DISTRIBUTED FABRIC SYSTEM

(75) Inventors: Sushma Anantharam, Cupertino, CA (US); Nirapada Ghosh, Sunnyvale, CA (US); Keshav Govind Kamble, Fremont, CA (US); Dar-Ren Leu, San Jose, CA (US); Chandarani J. Mendon, San Jose, CA (US); Nilanjan Mukherjee, Santa Clara, CA (US); Vijoy Pandey, San Jose, CA (US); Nandakumar Peethambaram, Santa Clara, CA (US)

(73) Assignee: International Business Machines Corporation, Armonk, NY (US)

(*) Notice: Subject to any disclaimer, the term of this patent is extended or adjusted under 35 U.S.C. 154(b) by 409 days.

(21) Appl. No.: 13/414,684

(22) Filed: Mar. 7, 2012

(65) Prior Publication Data

US 2013/0235735 A1 Sep. 12, 2013

(51) Int. Cl.
*H04L 12/28* (2006.01)
*G06F 15/173* (2006.01)
(Continued)

(52) U.S. Cl.
CPC .......... *H04L 43/0817* (2013.01); *H04L 43/0811* (2013.01); *H04L 41/22* (2013.01); *H04L 41/12* (2013.01); *H04L 49/555* (2013.01); *H04L 43/045* (2013.01)

(58) Field of Classification Search
CPC ... H04L 43/0817; H04L 43/045; H04L 41/12; H04L 49/555; H04L 41/22; H04L 12/5601; H04L 43/0811; H04L 49/256; H04L 49/356; H04L 49/65

USPC .......... 370/252–503; 709/250–252; 710/316, 710/317
See application file for complete search history.

(56) References Cited

U.S. PATENT DOCUMENTS

| 5,226,120 A | 7/1993 | Brown et al. |
| 5,522,042 A | 5/1996 | Fee et al. |

(Continued)

FOREIGN PATENT DOCUMENTS

| CN | 101098260 A | 1/2008 |
| CN | 102082690 A | 6/2011 |

(Continued)

OTHER PUBLICATIONS

Allen, D., "From the Data Center to the Network: Virtualization bids to remap the LAN", Network Magazine, vol. 19, No. 2, Feb. 2004; 5 pages.

(Continued)

*Primary Examiner* — Nicholas Sloms
(74) *Attorney, Agent, or Firm* — Schmeiser, Olsen & Watts LLP; Michael A. Rodriguez

(57) ABSTRACT

A distributed fabric system has distributed line card (DLC) chassis and scaled-out fabric coupler (SFC) chassis. Each DLC chassis includes a network processor and fabric ports. Each network processor of each DLC chassis includes a fabric interface in communication with the DLC fabric ports of that DLC chassis. Each SFC chassis includes a fabric element and fabric ports. A communication link connects each SFC fabric port to one DLC fabric port. Each communication link includes cell-carrying lanes. Each fabric element of each SFC chassis collects per-lane statistics for each SFC fabric port of that SFC chassis. Each SFC chassis includes program code that obtains the per-lane statistics collected by the fabric element chip of that SFC chassis. A network element includes program code that gathers the per-lane statistics collected by each fabric element of each SFC chassis and integrates the statistics into a topology of the entire distributed fabric system.

19 Claims, 10 Drawing Sheets

(51) Int. Cl.
  *G06F 13/00* (2006.01)
  *H04L 12/26* (2006.01)
  *H04L 12/24* (2006.01)
  *H04L 12/939* (2013.01)

(56) References Cited

U.S. PATENT DOCUMENTS

| | | | |
|---|---|---|---|
| 5,751,967 A | 5/1998 | Raab et al. | |
| 6,205,122 B1 | 3/2001 | Sharon et al. | |
| 6,597,689 B1* | 7/2003 | Chiu et al. | 370/354 |
| 6,856,591 B1 | 2/2005 | Ma et al. | |
| 6,880,086 B2* | 4/2005 | Kidder et al. | 713/191 |
| 6,917,626 B1 | 7/2005 | Duvvury | |
| 6,934,749 B1* | 8/2005 | Black et al. | 709/224 |
| 7,020,696 B1* | 3/2006 | Perry et al. | 709/223 |
| 7,095,744 B2* | 8/2006 | Iny | 370/395.6 |
| 7,133,403 B1 | 11/2006 | Mo et al. | |
| 7,143,153 B1* | 11/2006 | Black et al. | 709/223 |
| 7,225,244 B2* | 5/2007 | Reynolds et al. | 709/223 |
| 7,230,917 B1* | 6/2007 | Fedorkow et al. | 370/229 |
| 7,240,364 B1* | 7/2007 | Branscomb et al. | 726/9 |
| 7,263,597 B2* | 8/2007 | Everdell et al. | 712/11 |
| 7,266,595 B1* | 9/2007 | Black et al. | 709/223 |
| 7,295,566 B1* | 11/2007 | Chiu et al. | 370/419 |
| 7,299,290 B2* | 11/2007 | Karpoff | 709/231 |
| 7,305,492 B2 | 12/2007 | Bryers et al. | |
| 7,349,960 B1* | 3/2008 | Pothier et al. | 709/224 |
| 7,369,540 B1 | 5/2008 | Giroti | |
| 7,406,038 B1* | 7/2008 | Oelke et al. | 370/225 |
| 7,441,154 B2 | 10/2008 | Klotz et al. | |
| 7,492,779 B2 | 2/2009 | Schzukin et al. | |
| 7,693,976 B2* | 4/2010 | Perry et al. | 709/223 |
| 7,765,328 B2 | 7/2010 | Bryers et al. | |
| 7,818,387 B1 | 10/2010 | King et al. | |
| 7,827,248 B2 | 11/2010 | Oyadomari et al. | |
| 7,921,686 B2 | 4/2011 | Bagepalli et al. | |
| 8,194,534 B2 | 6/2012 | Pandey et al. | |
| 8,265,071 B2 | 9/2012 | Sindhu et al. | |
| 8,335,213 B2 | 12/2012 | Sindhu et al. | |
| 8,340,088 B2 | 12/2012 | Sindhu et al. | |
| 8,345,675 B1* | 1/2013 | Raghunath | 370/388 |
| 8,358,660 B2* | 1/2013 | Pacella et al. | 370/396 |
| 8,477,730 B2* | 7/2013 | Rajagopalan et al. | 370/331 |
| 8,537,829 B2 | 9/2013 | Mehta | |
| 8,687,629 B1* | 4/2014 | Kompella et al. | 370/388 |
| 8,773,999 B2 | 7/2014 | Campbell et al. | |
| 8,780,931 B2 | 7/2014 | Anantharam et al. | |
| 8,789,164 B2 | 7/2014 | Kamble et al. | |
| 2002/0001307 A1* | 1/2002 | Nguyen et al. | 370/386 |
| 2002/0046271 A1 | 4/2002 | Huang | |
| 2002/0057018 A1* | 5/2002 | Branscomb et al. | 307/42 |
| 2002/0080780 A1* | 6/2002 | McCormick et al. | 370/355 |
| 2002/0116485 A1* | 8/2002 | Black et al. | 709/223 |
| 2002/0141427 A1* | 10/2002 | McAlpine | 370/413 |
| 2002/0165961 A1* | 11/2002 | Everdell et al. | 709/225 |
| 2003/0120822 A1* | 6/2003 | Langrind et al. | 709/251 |
| 2003/0126195 A1* | 7/2003 | Reynolds et al. | 709/203 |
| 2003/0169748 A1 | 9/2003 | Weyman et al. | |
| 2004/0031030 A1* | 2/2004 | Kidder et al. | 717/172 |
| 2004/0119735 A1 | 6/2004 | Subbarao et al. | |
| 2005/0063354 A1 | 3/2005 | Garnett et al. | |
| 2005/0089054 A1* | 4/2005 | Ciancaglini et al. | 370/412 |
| 2005/0105538 A1 | 5/2005 | Perera et al. | |
| 2005/0135357 A1 | 6/2005 | Riegel et al. | |
| 2005/0141499 A1 | 6/2005 | Ma et al. | |
| 2005/0141523 A1* | 6/2005 | Yeh et al. | 370/400 |
| 2005/0198247 A1* | 9/2005 | Perry et al. | 709/223 |
| 2005/0198373 A1 | 9/2005 | Saunderson et al. | |
| 2006/0092832 A1 | 5/2006 | Santoso et al. | |
| 2006/0098672 A1 | 5/2006 | Schzukin et al. | |
| 2007/0083528 A1 | 4/2007 | Matthews et al. | |
| 2007/0121499 A1 | 5/2007 | Pal et al. | |
| 2007/0136458 A1 | 6/2007 | Boyd et al. | |
| 2007/0147279 A1 | 6/2007 | Smith et al. | |
| 2007/0266384 A1 | 11/2007 | Labrou et al. | |
| 2008/0170578 A1 | 7/2008 | Ould-Brahim | |
| 2008/0275975 A1 | 11/2008 | Pandey et al. | |
| 2009/0059957 A1 | 3/2009 | Bagepalli et al. | |
| 2009/0129398 A1 | 5/2009 | Riegel et al. | |
| 2009/0157844 A1 | 6/2009 | Fionda et al. | |
| 2009/0157884 A1 | 6/2009 | Anderson et al. | |
| 2009/0198836 A1 | 8/2009 | Wittenschlaeger | |
| 2009/0228418 A1 | 9/2009 | Ramesh et al. | |
| 2010/0061240 A1 | 3/2010 | Sindhu et al. | |
| 2010/0061241 A1 | 3/2010 | Sindhu et al. | |
| 2010/0061242 A1 | 3/2010 | Sindhu et al. | |
| 2010/0061367 A1 | 3/2010 | Sindhu et al. | |
| 2010/0061389 A1 | 3/2010 | Sindhu et al. | |
| 2010/0061391 A1 | 3/2010 | Sindhu et al. | |
| 2010/0061394 A1 | 3/2010 | Sindhu et al. | |
| 2010/0162036 A1 | 6/2010 | Linden et al. | |
| 2010/0169446 A1 | 7/2010 | Linden et al. | |
| 2010/0182934 A1 | 7/2010 | Dobbins et al. | |
| 2010/0214949 A1 | 8/2010 | Smith et al. | |
| 2010/0303086 A1* | 12/2010 | Bialkowski | 370/401 |
| 2010/0315972 A1 | 12/2010 | Plotnik et al. | |
| 2011/0047467 A1 | 2/2011 | Porter | |
| 2011/0093574 A1 | 4/2011 | Koehler et al. | |
| 2011/0103259 A1 | 5/2011 | Aybay et al. | |
| 2011/0116376 A1* | 5/2011 | Pacella et al. | 370/235 |
| 2011/0179315 A1 | 7/2011 | Yang | |
| 2011/0228669 A1* | 9/2011 | Lei et al. | 370/219 |
| 2011/0238816 A1 | 9/2011 | Vohra et al. | |
| 2012/0002670 A1 | 1/2012 | Subramanian et al. | |
| 2012/0020373 A1 | 1/2012 | Subramanian et al. | |
| 2012/0063464 A1 | 3/2012 | Mehta | |
| 2012/0155453 A1 | 6/2012 | Vohra et al. | |
| 2012/0170548 A1 | 7/2012 | Rajagopalan et al. | |
| 2012/0287926 A1* | 11/2012 | Anantharam et al. | 370/355 |
| 2012/0294314 A1* | 11/2012 | Campbell et al. | 370/412 |
| 2012/0297103 A1* | 11/2012 | Kamble et al. | 710/305 |
| 2012/0324442 A1 | 12/2012 | Barde | |
| 2013/0060929 A1 | 3/2013 | Koponen et al. | |
| 2013/0064102 A1 | 3/2013 | Chang et al. | |
| 2013/0088971 A1* | 4/2013 | Anantharam et al. | 370/236 |
| 2013/0089089 A1* | 4/2013 | Kamath et al. | 370/358 |
| 2013/0103817 A1 | 4/2013 | Koponen et al. | |
| 2013/0107709 A1* | 5/2013 | Campbell et al. | 370/235 |
| 2013/0107713 A1* | 5/2013 | Campbell et al. | 370/235 |
| 2013/0142196 A1* | 6/2013 | Cors et al. | 370/360 |
| 2013/0201873 A1* | 8/2013 | Anantharam et al. | 370/255 |
| 2013/0201875 A1 | 8/2013 | Anantharam et al. | |
| 2013/0235735 A1* | 9/2013 | Anantharam et al. | 370/250 |
| 2013/0235762 A1* | 9/2013 | Anantharam et al. | 370/255 |
| 2013/0235763 A1* | 9/2013 | Anantharam et al. | 370/255 |
| 2013/0242999 A1* | 9/2013 | Kamble et al. | 370/392 |
| 2013/0247168 A1* | 9/2013 | Kamble et al. | 726/12 |
| 2013/0315233 A1* | 11/2013 | Kamble et al. | 370/385 |
| 2013/0315234 A1* | 11/2013 | Kamble et al. | 370/385 |
| 2014/0064105 A1* | 3/2014 | Anantharam et al. | 370/250 |

FOREIGN PATENT DOCUMENTS

| | | |
|---|---|---|
| JP | 200971619 | 4/2009 |
| JP | 2009542053 | 11/2009 |

OTHER PUBLICATIONS

Aureglia, JJ, et al., "Power Backup for Stackable System", IP.com, Dec. 1, 1995, 5 pages.
"Control Plane Scaling and Router Virtualization", Juniper Networks, 2010; 12 pages.
Coti et al., "MPI Applications on Grids: a Topology Aware Approach", Euro-Par, Paralell Processing, Lecture Notes in Computer Science, 2009, University of Paris, Orsay, France; 12 pages.
IBM, "A Non-invasive Computation-assist Device for Switching Fabrics in a High-Performance Computing System", IP.com, Aug. 30, 2007, 5 pages.
International Search Report and Written Opinion in related international application No. PCT/IB2013/051339, mailed on May 21, 2013; 8 pages.
Kandalla et al., "Designing Topology-Aware Collective Communication Algorithms for Large Scale Infiniband Clusters: Case Studies

(56) References Cited

OTHER PUBLICATIONS with Scatter and Gather", IEEE International Symposium on Parallel & Distributed Processing, Workshops and PhD Forum, 2010; 8 pages.
Lawrence et al., "An MPI Tool for Automatically Discovering the Swtich Level Topologies of Ethernet Clusters", IEEE International Symposium on Paralell and Distributed Processing, Apr. 2008, Miami, FL; 8 pages.
Malavalli, Kumar, "High Speed Fibre Channel Switching Fabric Services", SPIE Conference on High-Speed Fiber Networks and Channels, Boston, MA (USA), Sep. 1991; 11 pages.
Ni, Lionel M., et al., "Switches and Switch Interconnects", Michigan State University, Jun. 1997; 8 pages.
Rogerio, Drummond, "Impact of Communication Networks on Fault-Tolerant Distributed Computing", IP.com, Apr. 20, 1986, 53 pages.
Shunsuke Fujita et al., Effect of application order of topology inference rule for Layer2 Network Topology visualizing System, IPSJ SIG Technical Reports, Feb. 26, 2009, vol. 2009, No. 21, p. 185-190. (Tanslation of abstract only.).
Takafumi Hamano et al., Packet forwarding control functions of an Open Architecture Router, IEICE Technical Report, Jun. 16, 2006, vol. 105, No. 127, p. 45-48. (Translation of abstract only.)
Tate, J. et al., "IBM b-type Data Center Networking: Design and Best Practices Introduction", IBM Redbooks; Dec. 2010; 614 pages.
Non-Final Office Action in related U.S. Appl. No. 13/364,896, mailed on Nov. 21, 2013; 33 pages.
Non-Final Office Action in related U.S. Appl. No. 13/453,644, mailed on Nov. 25, 2013; 16 pages.
Ayandeh, Siamack, "A Framework for Benchmarking Performance of Switch Fabrics", 10th Annual International Conference on Telecommunication, IEEE Conference Proceedings, vol. 2, 2003; pp. 1650-1655.
Teow, K., "Definitions of Managed Objects for the Fabric Element in Fibre Channel Standard (RFC2837)", IP.com, May 1, 2000; 41 pages.
Brey et al "BladeCenter Chassis Management", IBM J. Res. & Dev. vol. 49, No. 6, Nov. 2005; pp. 941-961.
Cisco, "Chapter 4: Switch Fabric", Cisco CRS Carrier Routing System 16-Slot Line Card Chassis System Description, Cisco.com, accessed Jan. 2012; 6 pages.
Non-Final Office Action in related U.S. Appl. No. 13/454,987, mailed on May 19, 2014; 16 pages.
Non-Final Office Action in related U.S. Appl. No. 13/414,677, mailed on May 20, 2014; 14 pages.
Final Office Action in related U.S. Appl. No. 13/453,644, mailed on May 21, 2014; 25 pages.
Final Office Action in related U.S. Appl. No. 13/364,896, mailed on Jun. 4, 2014; 34 pages.
Non-Final Office Action in related U.S. Appl. No. 14/072,941, mailed on Jul. 31, 2014; 19 pages.
International Search Report & Written Opinion in related international patent application No. PCT/IB2013/050428, mailed on Jun. 20, 2013; 9 pages.
Examination Report in related United Kingdom Patent Application No. 1412787.2, mailed Aug. 26, 2014; 3 pages.
Non-Final Office Action in related U.S. Appl. No. 13/453,644, mailed on Sep. 10, 2014; 26 pages.
Notice of Allowance in related U.S. Appl. No. 13/454,987, mailed on Sep. 23, 2014; 10 pages.
Notice of Allowance in related U.S. Appl. No. 13/414,677, mailed on Oct. 24, 2014; 9 pages.
Notice of Allowance in related U.S. Appl. No. 13/646,378, mailed on Nov. 28, 2014; 7 pages.
Notice of Allowance in related U.S. Appl. No. 13/414,677, mailed on Dec. 3, 2014; 10 pages.
Non-Final Office Action in related U.S. Appl. No. 13/646,378, mailed on Apr. 15, 2014; 23 pages.
Notice of Allowance in related U.S. Appl. No. 13/646,378, mailed on Oct. 9, 2014; 8 pages.
Non-Final Office Action in related U.S. Appl. No. 13/364,896, mailed on Nov. 19, 2014; 45 pages.
Notice of Allowance in related U.S. Appl. No. 13/646,378, mailed on Dec. 31, 2014; 7 pages.
Notice of Allowance in related U.S. Appl. No. 14/072,941, mailed on Feb. 12, 2015; 7 pages.
Notice of Allowance in related U.S. Appl. No. 13/414,677, mailed on Mar. 2, 2015; 7 pages.
Notice of Allowance in related U.S. Appl. No. 13/453,644, mailed on Feb. 27, 2015; 17 pages.
Notice of Allowance in related U.S. Appl. No. 13/364,896, mailed on Mar. 12, 2015; 10 pages.
Notice of Allowance in related U.S. Appl. No. 13/454,987, mailed on Feb. 4, 2015; 7 pages.

\* cited by examiner

DIAGNOSTICS IN A DISTRIBUTED FABRIC SYSTEM

FIELD OF THE INVENTION

The invention relates generally to data centers and data processing. More particularly, the invention relates to diagnostics in a distributed fabric system.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. The infrastructure of the data center, specifically, the layers of switches in the switch fabric, plays a central role in the support of the services. Implementations of data centers can have hundreds and thousands of switch chassis, and the interconnections among the various chassis can be complex and difficult to follow. Moreover, the numerous and intricate interconnections among the various chassis can make problems arising in the data center formidable to troubleshoot.

SUMMARY

In one aspect, the invention features a computer program product for managing a distributed fabric system in which at least one scaled-out fabric coupler (SFC) chassis is connected to at least one distributed line card (DLC) chassis over fabric communication links. Each fabric communication link connects one fabric port of the at least one SFC chassis to one fabric port of the at least one DLC chassis. Each fabric communication link includes a plurality of lanes by which to carry cells. The computer program product comprises a computer-readable storage medium having computer-readable program code embodied therewith. The computer-readable program code comprises computer-readable program code configured to collect, by each fabric element chip of each SFC chassis, per-lane statistics for each SFC fabric port of that SFC chassis. The computer-readable program code further comprises computer-readable program code configured to gather the per-lane statistics collected by each fabric element chip of each SFC chassis by a central agent, and computer-readable program code configured to integrate the per-lane statistics gathered by the central agent into a topology of the entire distributed fabric system for presentation by a user interface.

In another aspect, the invention features a distributed fabric system comprising at least one distributed line card (DLC) chassis and at least one scaled-out fabric coupler (SFC) chassis. Each DLC chassis includes at least one network processor and a plurality of DLC fabric ports. Each network processor of each DLC chassis includes a fabric interface in communication with the DLC fabric ports of that DLC chassis. Each SFC chassis includes a fabric element chip and a plurality of SFC fabric ports. Each SFC fabric port is connected to one of the DLC fabric ports by a fabric communication link. Each fabric communication link includes a plurality of lanes by which to carry cells. Each fabric element chip of each SFC chassis collects per-lane statistics for each SFC fabric port of that SFC chassis. Each SFC chassis further includes a processor and memory storing program code configured to obtain, when executed, the per-lane statistics collected by the fabric element chip of that SFC chassis. A network element includes a processor and memory storing program code configured to gather the per-lane statistics collected by each fabric element chip of each SFC chassis and to integrate the gathered per-lane statistics into a topology of the entire distributed fabric system for presentation by a user interface.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Distributed fabric systems described herein include independent scaled-out fabric coupler (SFC) chassis in communication with a plurality of independent distributed line card (DLC) chassis. The SFC chassis have one or more cell-based fabric element chips that communicate through SFC fabric ports over communication links with fabric interfaces of the switching chips on the DLC chassis. Each fabric element chip can take statistical measurements of the activity at each of the SFC fabric ports. Similarly, each DLC fabric interface can take statistical measurements of activity on the DLC fabric ports. Such statistical measurements include, but are not limited to, counting a number of cells transmitted and received during a measurement period, and counting errored cells. From a management station, a network administrator can display this statistical information graphically or through a command line interface (CLI) along with the topology of the distributed fabric system. The display of the information gives the network administrator a real-time snapshot of the performance of the various communication links of the distributed fabric system and a tool by which to troubleshoot problems.

Figure 1:
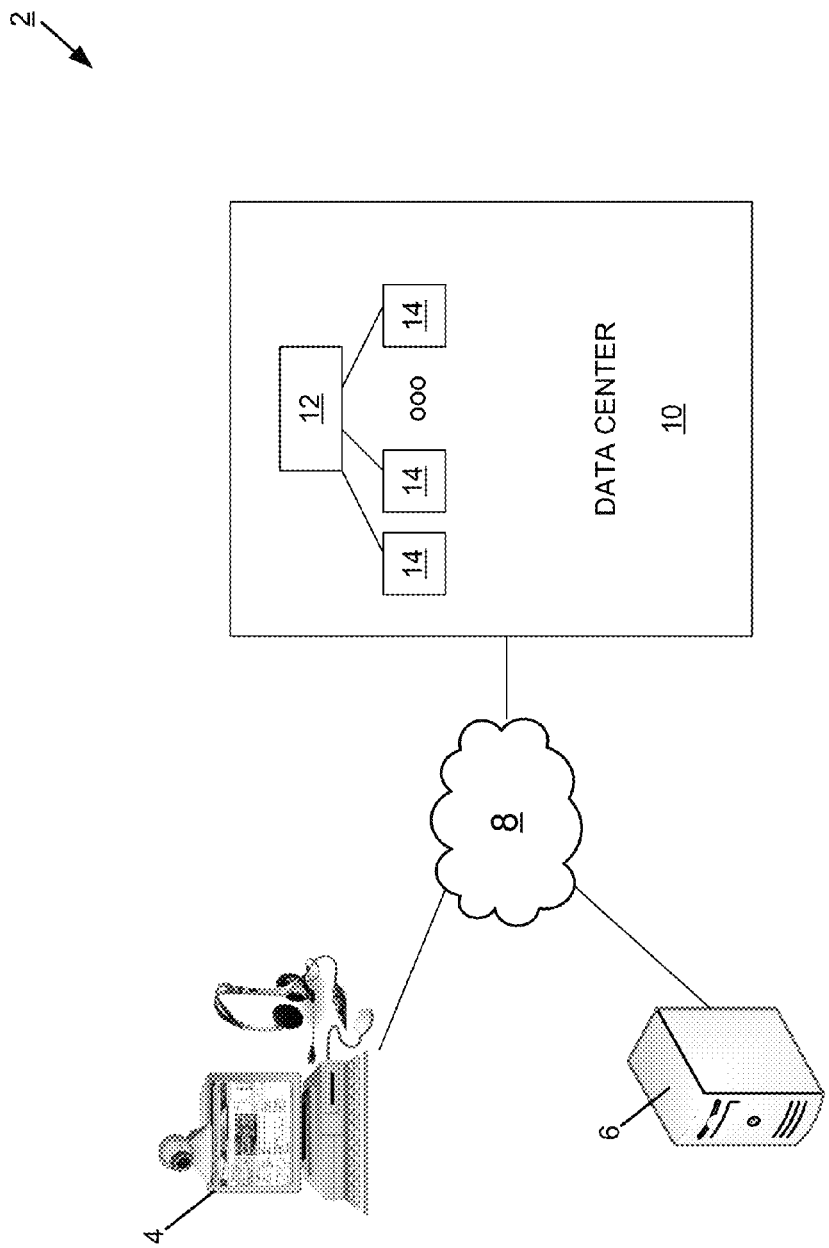
FIG. 1 is an embodiment of a networking environment including a data center, a server, and a management station.

FIG. 1 shows an embodiment of a networking environment 2 including a data center 10 in communication with a management station 4 and a server 6 over a network 8. Embodiments of the network 8 include, but are not limited to, local-area networks (LAN), metro-area networks (MAN), and wide-area networks (WAN), such as the Internet or World Wide Web. The data center 10 is generally a facility that houses various computers, routers, switches, and other associated equipment in support of applications and data that are integral to the operation of a business, organization, or other entities.

The data center 10 includes an SFC chassis 12 in communication with network elements 14, referred to herein as distributed line cards (DLCs) 14. The SFC chassis 12 and DLCs 14 together form a distributed fabric system and correspond to a single cell-switched domain. Although four DLC chassis 14 only are shown, the number of DLC chassis in the cell-switched domain can range in the hundreds and thousands. The DLCs 14 are members of a designated cluster. The data center 10 can have more than one cluster, although each DLC can be the member of one cluster only. The data center 10 may be embodied at a single site or distributed among multiple sites. Although shown outside of the data center 10, either (or both) of the management station 4 and server 6 may be considered part of the data center 10.

In the data center 10, the functionality occurs on three planes: a management plane, a control plane, and a data plane. The management of the cluster, such as configuration management, runtime configuration management, presentation of information (show and display), graph generation, and handling SNMP requests, occurs on the management plane. The control plane is associated with those functions involving network signaling and control protocols. The data plane manages data flow. In the data center 10, the functionality of the management plane and of the control plane is centralized, the management plane and control plane being implemented predominately at the server 6, and the functionality of the data plane is distributed among the DLCs 14 and SFCs 12.

The management station 4 provides a centralized point of administration for managing and controlling the networked switches 12, 14 and the controller 6 of the distributed fabric system. Through the management station 4, a user or network administrator of the data center 10 communicates with the controller 6 in order to manage the cluster, with conceivably hundreds s of DLCs, tens of SFCs, and one or more controllers, from a single location. A graphical user interface (GUI) application executing on the management station 4 serves to provide the network administrator with a view of the entire network topology of the distributed fabric system. An example of such a GUI application is Blade Harmony Manager® provided by IBM Corporation of Armonk, N.Y. In brief, the GUI-based application can use the information collected by the fabric element chips of the SFCs to represent an entire distributed fabric system topology in graphical form, as described in more detail below.

In addition, the management station 4 can connect directly (point-to-point) or indirectly to a given DLC 14 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet or SNMP (Simple Network Management Protocol), the management station 4 can access a command-line interface (CLI) of the control plane server 6 of the whole system for purposes of managing the distributed fabric system and accessing the topology and statistical information collected by the various network switches, as described in more detail below.

In general, the server 6 is a computer (or group of computers) that provides one or more services to the data center 10, examples of which include, but are not limited to, email servers, proxy servers, DNS servers, and a control server running the control plane of the distributed fabric system. To support the control plane functionality of an entire DLC cluster, the server 6 is configured with sufficient processing power (e.g., with multiple processor cores).

Figure 2:
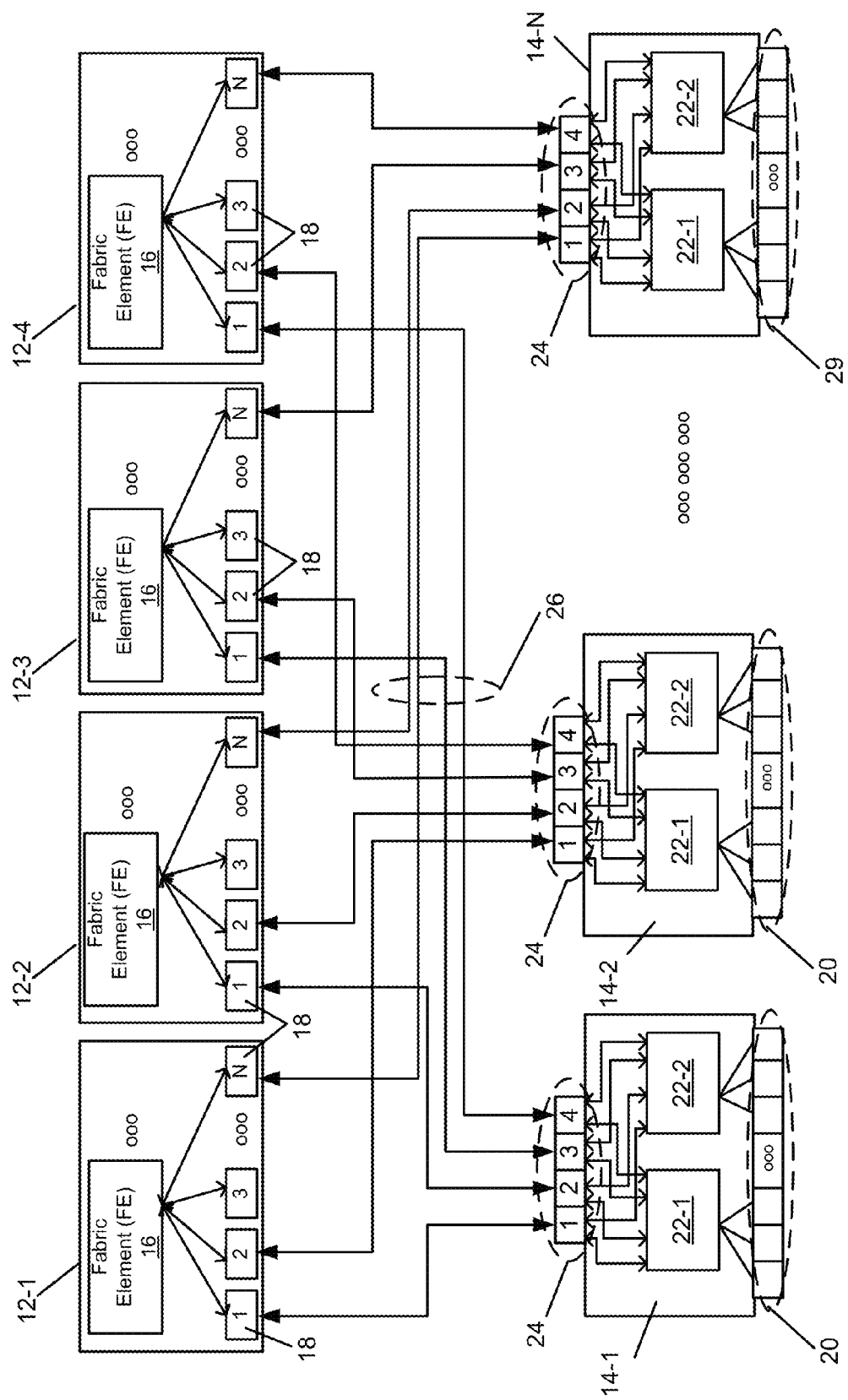
FIG. 2 is a functional block diagram of an embodiment of a distributed fabric system having a plurality of scaled-out fabric couplers (SFC) chassis interconnected with a plurality of distributed line card (DLC) chassis.

FIG. 2 shows an embodiment of a distributed fabric system having a plurality of independent SFC chassis 12-1, 12-2, 12-3, and 12-4 (generally, 12) in communication with a plurality of independent DLC chassis or boxes 14-1, 14-2, 14-N (generally, 14). This example embodiment has four SFC chassis 12 and N DLC chassis 14. The SFCs 12 and DLCs 14 are part of a single cell-based switched domain.

Each SFC chassis 12 includes one or more cell-based switch fabric elements (FE) 16 in communication with N SFC fabric ports 18. In this example embodiment, there are at least as many DLC chassis 14 as SFC fabric ports 18 in each SFC chassis 12 in the distributed fabric system. Each fabric element 16 of an SFC chassis 12 switches cells between SFC fabric ports 18 based on destination information in the cell header.

Each DLC chassis 14 has network ports 20, network processors 22-1, 22-2 (also called switching chips), and fabric ports 24. In general, network processors 22 are optimized for packet processing. Each network processor 22 is in communication with every fabric port 24 and with a subset of the network ports 20 (for example, each network processor 22 can switch cells derived from packet traffic received on half the network ports of the DLC). An example implementation of the network processor 24 is the BCM 88650, a 28-port, 10 GbE switch device produced by Broadcom, of Irvine, Calif. The network ports 20 are in communication with the network 8 external to the switched domain, such as the Internet. In one embodiment, each DLC chassis 14 has forty network ports 20, with each of the network ports 20 being configured as a 10 Gbps Ethernet port. The aggregate network bandwidth of the DLC chassis 14 is 400 Gbps.

The distributed fabric system in FIG. 2 has a full-mesh configuration: each DLC 14 is in communication with each of the SFCs 12 over; more specifically, each of the fabric ports 24 of a given DLC chassis 14 is in electrical communication with a fabric port 44 of a different one of the SFCs 12 over a fabric communication link 26. Referring to the DLC 14-1 as a representative example, the DLC fabric port 24-1 of the DLC 14-1 is in communication with the fabric port 18-1 of the SFC 12-1, the DLC fabric port 24-2 is in communication with the fabric port 18-1 of the SFC 12-2, the DLC fabric port 24-3 is in communication with the fabric port 18-1 of the SFC 12-3, and the DLC fabric port 24-4 is in communication with the fabric port 18-1 of the SFC 12-4. Connected in this full-mesh configuration, the DLCs and SFCs form a distributed virtual chassis, with the DLCs acting as line cards. The distributed virtual chassis is virtually a modular chassis; that is, DLCs 14 can be added to or removed from the distributed virtual chassis, one at a time, just like line cards added to or removed from a physical chassis. The full-mesh configuration is but one example of a distributed fabric system architecture. Other types of configurations in which to connect the DLCs and SFCs include, but are not limited to, daisy chains and star formations.

The communication link 26 between each DLC fabric port 24 and an SFC fabric port 18 can be a wired connection. Interconnect variants include Direct Attached Cable (DAC) or optical cable. DAC provides five to seven meters of cable length; whereas the optical cable offers up to 100 meters of connectivity within the data center, (standard optical connectivity can exceed 10 km). Alternatively, the communication link 26 can be a direct physical connection (i.e., electrical connectors of the DLC fabric ports 24 physically connect directly to electrical connectors of the SFC fabric ports 18). In one embodiment, each communication link supports 12 SerDes (serializer/deserializer) channels (each channel being comprised of a transmit lane and a receive lane).

During operation of this distributed fabric system, a packet arrives at a network port 20 of one of the DLCs 14. The network processor 22 extracts required information from the packet header and payload to form pre-classification metadata. Using this meta-data, the network processor 22 performs table look-ups to find the physical destination port for this packet and other associated actions. With these results and metadata, the network processor 22 creates and appends a proprietary header to the front of the packet. The network processor 22 of the DLC 14 in communication with the network port 20 partitions the whole packet including the proprietary header into smaller cells, and adds a cell header (used in ordering of cells) to each cell. The network processor 22 sends the cells out through the DLC fabric ports 24 to each of the SFCs 12, sending different cells to different SFCs 12. For example, consider an incoming packet with a length of 1600 bits. The receiving network processor 22 of the DLC 14 can split the packet into four cells of 400 bits (before adding header information to those cells). The network processor 22 then sends a different cell to each of the four SFCs 12, in effect, achieving a load balancing of the cells across the SFCs 12.

A cell-based switch fabric element 16 of each SFC 12 receiving a cell examines the header of that cell, determines its destination, and sends the cell out through the appropriate one of the fabric ports 18 of that SFC to the destination DLC 14. The destination DLC 14 receives all cells related to the original packet from the SFCs, reassembles the original packet (i.e., removing the added headers, combining cells), and sends the reassembled packet out through the appropriate one of its network ports 20. Continuing with the previous four-cell example, consider that each SFC determines that the destination DLC is DLC 14-2. Each SFC 12 sends its cell out through its fabric port 18-2 to the DLC 14-2. The DLC 14-2 reassembles the packet from the four received cells (the added headers providing an order in which to combine the cells) and sends the packet out of the appropriate network port 20. The pre-classification header information in the cells determines the appropriate network port.

The full-mesh configuration of FIG. 2, having the four SFC chassis 12, can be a full-line rate configuration, that is, the aggregate bandwidth for transmitting cells from a given DLC to the SFCs (i.e., 480 Gbps) is greater than the aggregate bandwidth of packets arriving at the given DLC on the network ports 20 (i.e., 400 Gbps). The configuration can also be adapted to support various oversubscription permutations for DLCs 14. For example, instead of having four SFCs, the distributed virtual chassis may have only two SFC chassis (e.g., 12-1, 12-2), with each DLC 14 using only two fabric ports 24 for communicating with the SFC chassis 12, one fabric port 24 for each of the SFC chassis 12. This permutation of oversubscription has, for example, each DLC on its network side with an aggregate ingress 400 Gbps bandwidth (forty 10 Gbps Ethernet Ports) and an aggregate egress 240 Gbps cell-switching bandwidth on its two 120 Gbps fabric ports 24 for communicating with the two SFCs. Other oversubscription permutations can be practiced.

Figure 3:
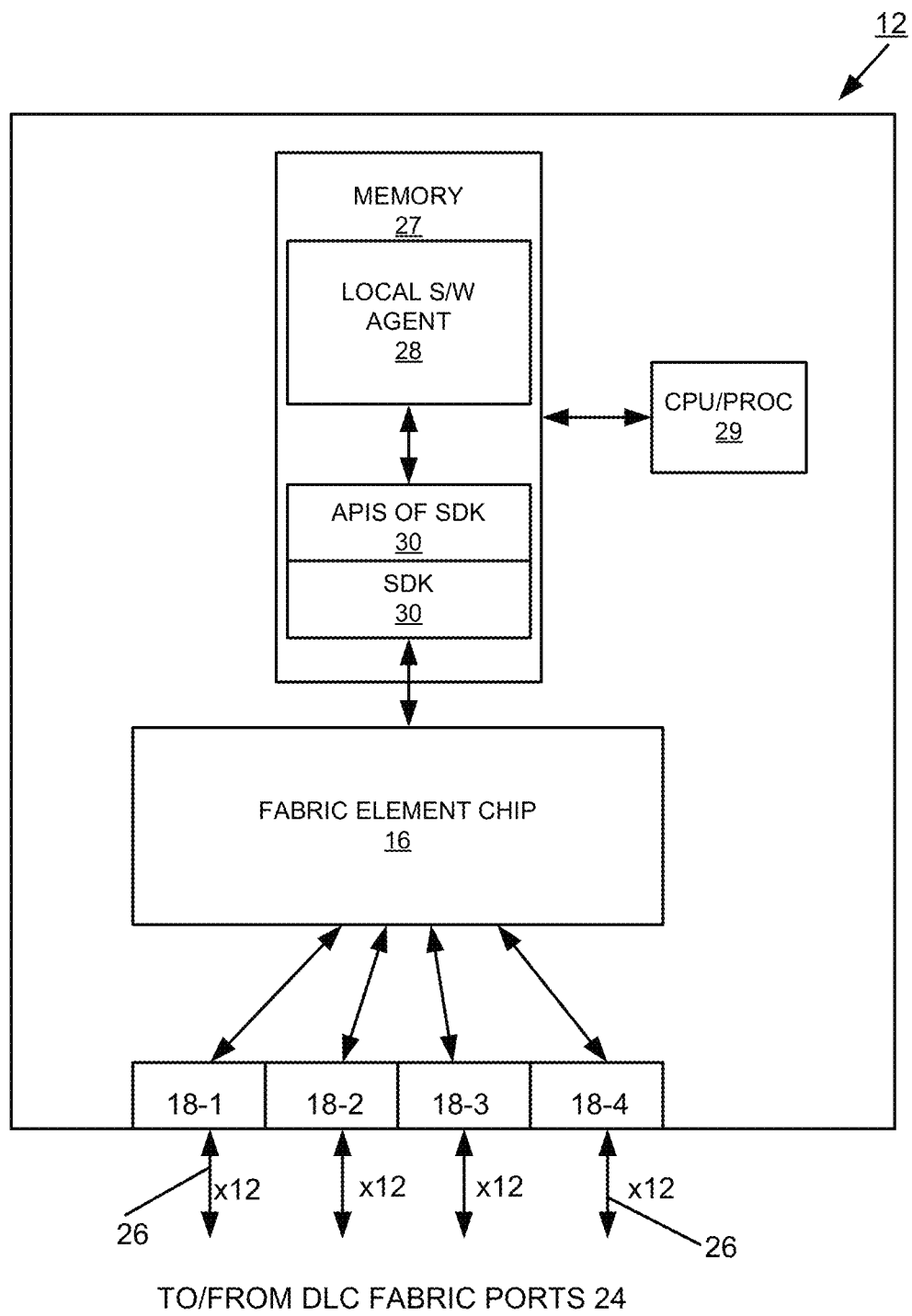
FIG. 3 is a functional block diagram of an SFC chassis having a local software agent for collecting topology and/or statistics.

FIG. 3 shows a functional block diagram of an embodiment of a SFC chassis including the cell-based fabric element chip 16 in communication with the SFC fabric ports 18-1, 18-2, 18-3, and 18-4 (generally, 18). Although referred to as a chip, the fabric element chip 16 may comprise multiple chips (i.e., a chipset). The fabric element chip 16 can be implemented with the BCM88750 produced by Broadcom, of Irvine, Calif. The SFC chassis 12 can have more than one fabric element chip 16 communicating through the fabric ports 18. Each SFC fabric port 18 is in communication with one of the DLC fabric ports over a communication link 26. Each communication link 26 comprises a plurality of SerDes channels. In one embodiment, the number of SerDes channels per communication link 26 is twelve (i.e., twelve receive lanes and twelve transmit lanes).

The fabric element chip 16 can collect information about the connectivity and statistical activity on each communication link between the fabric element chip 16 and the fabric ports 24 of the DLCs 14. Such information includes, but is not limited to, the status and bandwidth of each lane carried by the communication link in addition to various statistics related to cell transmission and receipt and to detected errors. This information is considered precise and reliable, and can be used to build the topology of the distributed fabric system. The fabric element chip 16 stores the collected information in one or more tables.

The SFC chassis 12 further includes a processor 25 in communication with memory 27. Stored in the memory 27 are local software agent 28, an SDK (software development kit) 30 associated with the fabric element chip 16, and an API layer 31 by which to communicate with the SDK 30. Through the SDK 30 and SDK APIs 31, the local software agent 28 can access each table in which the fabric element chip 16 has stored the collected connectivity and/or statistical information. The execution of the local software agent 28 can occur on demand.

Figure 4:
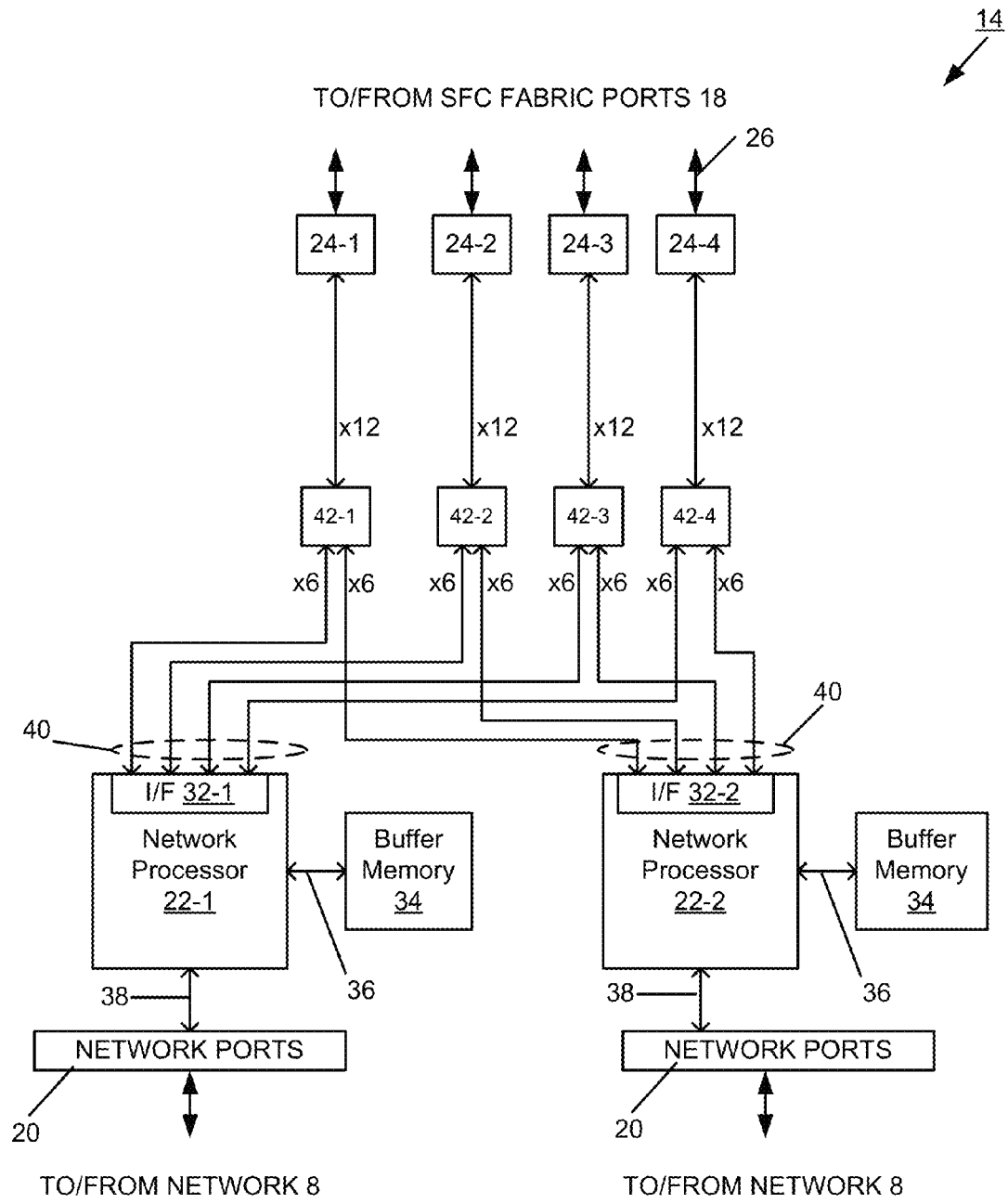
FIG. 4 is a functional block diagram of an embodiment of a DLC chassis including two network processors, each with a fabric interface.

FIG. 4 shows a block diagram of an embodiment of each DLC 14 having the network ports 20 in communication with the network processors 22-1, 22-2 through a PHY interface 38. In one embodiment, the PHY interface 38 includes an XFI electrical interface (of a 10 Gigabit Small Form Factor Pluggable Module (XFP)) for each of the network ports 20. Each network processor 22 has a fabric interface (I/F) 32 and is in communication with buffer memory 34 over memory channels 36. In one embodiment, the buffer memory 34 is implemented with 1866 MHz DDR3 SDRAM (double data rate synchronous dynamic random access memory) devices.

The fabric interface 32 of each network processor 22 includes a SerDes (not shown) that preferably provides twenty-four SerDes channels 40. The SerDes includes a pair of functional blocks used to convert data between serial and parallel interfaces in each direction. In one embodiment, each SerDes channel 40 operates at a 10.3 Gbps bandwidth; the aggregate bandwidth of the twenty-four channels being approximately 240 Gbps (or 480 Gbps when taking both fabric interfaces 32). In another embodiment, each SerDes channel 40 operates at approximately 25 Gbps. The twenty-four SerDes channels 40 are grouped into four sets of six channels each.

The DLC 14 further includes PHYs 42-1, 42-2, 42-3, 42-4 (generally 42) in communication with the four (e.g., standard IB CXP) fabric ports 24-1, 24-2, 24-3, 24-4, respectively, of the DLC 14. Each of the PHYs 42 is also in communication with a group of six SerDes channels 40 from each of the two network processors 22-1, 22-2 (thus, each of the PHYs 42 supports twelve SerDes channels 40). In one embodiment, each PHY 42 is a 3×40 G PHY.

Preferably, each fabric port 24 of the DLC 14 includes a 120 Gbps CXP interface. In one embodiment, the CXP interface has twelve transmit and twelve receive SerDes lanes (12×) in a single form factor, each lane providing a 10 Gbps bandwidth. A description of the 120 Gbps 12× CXP interface can be found in the "Supplement to InfiniBand™ Architecture Specification Volume 2 Release 1.2.1", published by the InfiniBand™ Trade Association. This embodiment of 12-lane CXP is referred to as the standard InfiniBand (IB) CXP. In another embodiment, the CXP interface has 10 lanes (10×) for supporting 10-lane applications, such as 100 Gigabit Ethernet. This embodiment of 10-lane CXP is referred to as the Ethernet CXP.

Figure 5:
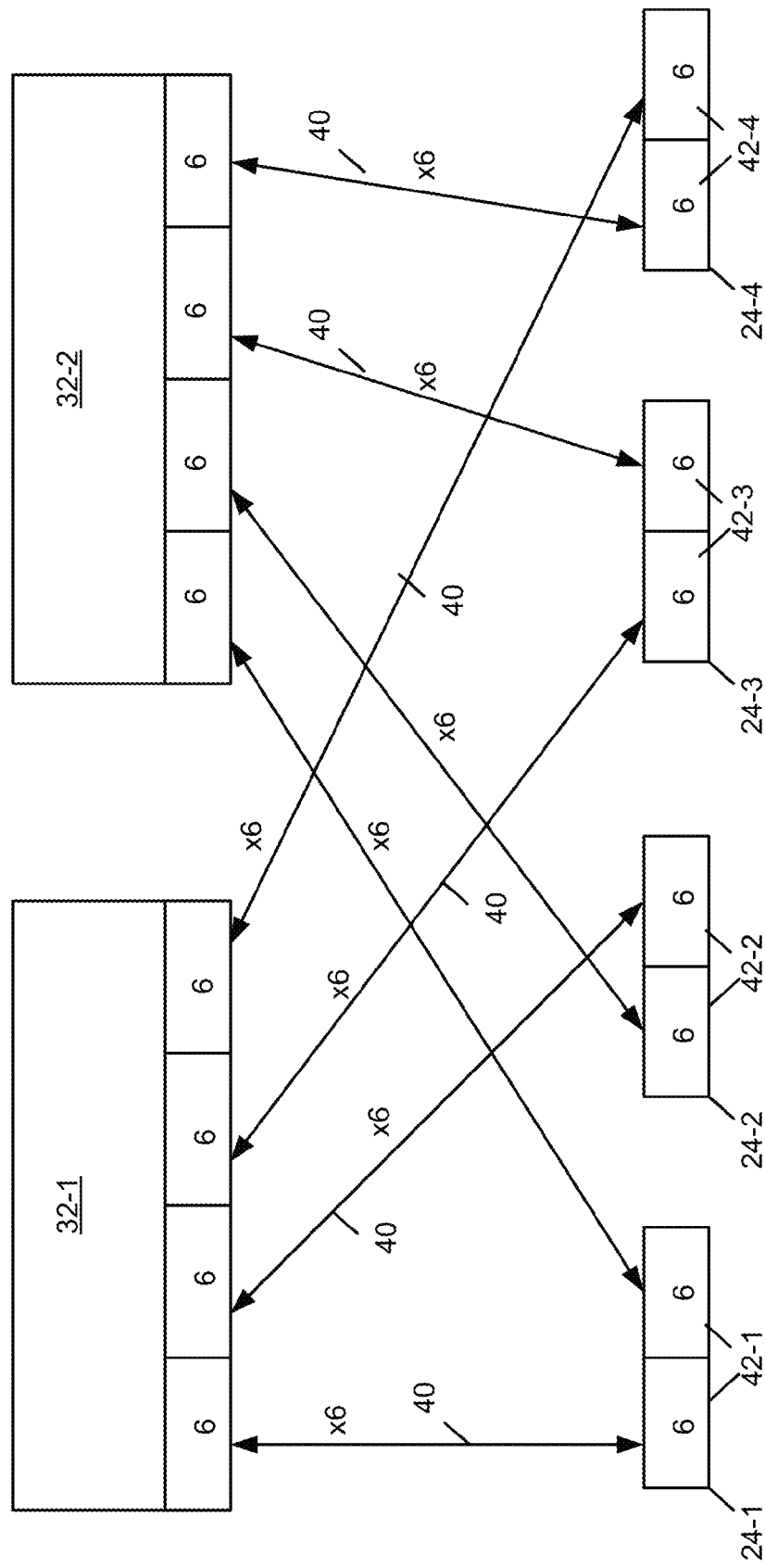
FIG. 5 is a functional block diagram of an embodiment of interconnections between the fabric interfaces of the two network processors and CXP/PHYs of a two-switch DLC chassis.

FIG. 5 shows an embodiment of the interface connections between the fabric interfaces 32-1, 32-2 (generally, 32) of the two network processors 22-1, 22-2, respectively, and the CXP fabric ports 24 of the DLC 14. In FIG. 5, the PHYs 42-1, 42-2, 42-3, and 42-4 are incorporated into the CXP fabric ports 24-1, 24-2, 24-3, and 24-4, respectively, with each CXP fabric port 24 supporting twelve pairs of lanes (one pair corresponds to Tx/Rv lanes). These twelve pairs of lanes map to six SerDes channels from each of the two fabric interfaces 32-1, 32-2. Each fabric interface 32 provides twenty-four SerDes channels 40 divided into four groups of six channels. For each of the fabric interfaces 32, one group of six SerDes channels 40 passes to a different one of the four fabric ports 24. For example, one group of six SerDes channels from each fabric interface 32-1, 32-2 maps to the PHYs 40-1 of the CXP fabric port 24-1, a second group of six SerDes channels from each fabric interface 32-1, 32-2 maps to the PHYs 42-2 of the CXP fabric port 24-2, a third group of six SerDes channels from each fabric interface 32-1, 32-2 maps to the PHYs 40-3 of the CXP fabric port 24-3, and a fourth group of six SerDes channels from each fabric interface 32-1, 32-2 maps to the PHYs 42-4 of the CXP fabric port 24-4.

Figure 6:
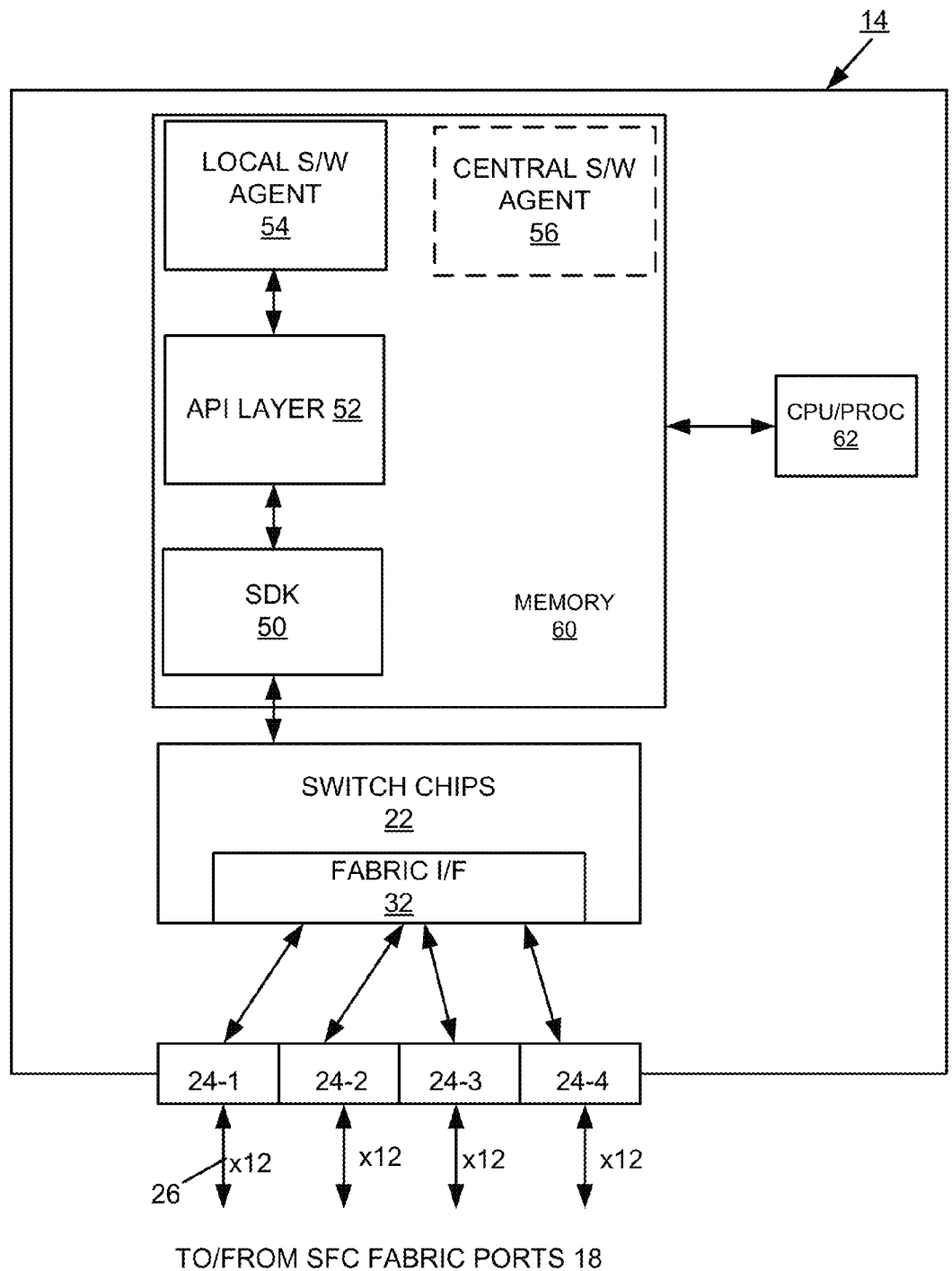
FIG. 6 is a functional block diagram of a DLC chassis having a local software agent and, optionally, a central software agent, the local software agent collecting performance statistics, and the central software agent collecting topology and/or statistics information for all SFCs and DLCs in the distributed fabric system.

FIG. 6 shows a functional block diagram of an embodiment of a DLC chassis 14 including the network processor chips 22, memory 60, and a processor 62. The memory 60 includes an SDK 50 associated with the network processor chips 22, an API layer 52 for communicating with the SDK 50, a local software agent 54, and, optionally, a central software agent 56. The fabric interfaces 32 of the network processors 22 are in communication with the DLC fabric ports 24-1, 24-2, 24-3, and 24-4. Each DLC fabric port 24 is in communication with one of the SFC fabric ports 18 over a communication link 26 comprised of preferably twelve SerDes channels (twelve pairs of Tx/Rv lanes).

Like the fabric element chips 16 of the SFCs, the network processor chips 22 can collect information about statistics related to activity at the fabric ports of the DLCs. Such information includes, but is not limited to, statistics about the health, usage, errors, and bandwidth of individual lanes of the each DFC fabric port 24. The network processor chips 22 can store the collected information in one or more tables. When executed, the local software agent 50 accesses each table through the API layer 54 and SDK layer 52. Such execution can occur on demand.

In general, the central software agent 56 gathers the information collected by each of the SFCs 12 in the distributed fabric system and creates the topology of the distributed fabric system. In FIG. 6, the central software agent 56 is shown to reside on the DLC 14. The central software agent 56 may be installed on each DLC, but be activated on the master DLC only. In another embodiment, the central software agent can instead reside on a server (e.g., server 6 of FIG. 1).

Figure 7A:
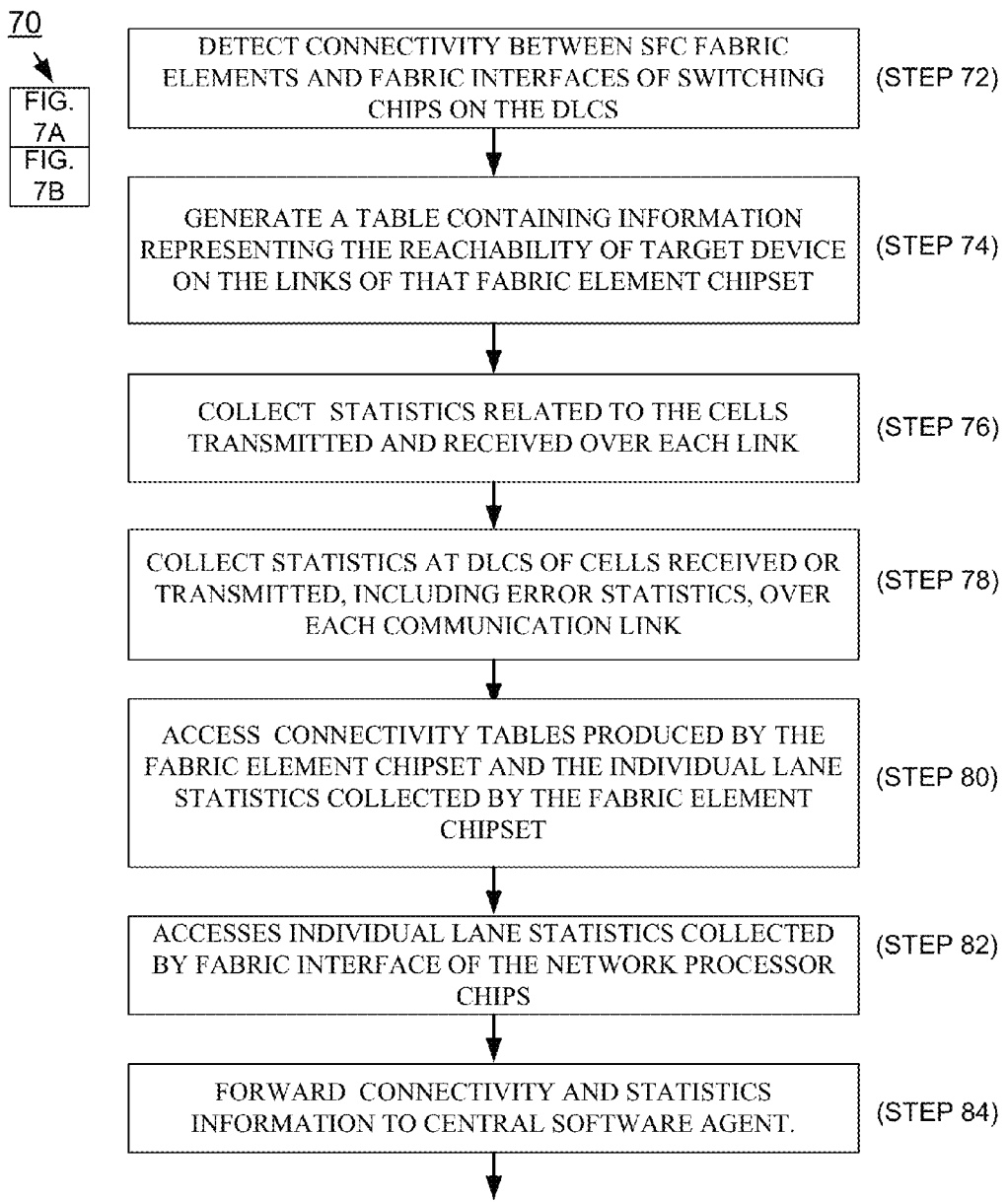
FIG. 7A and FIG. 7B comprise a flow diagram of a process for building a topology of the distributed fabric system, for collecting statistics related to the operation of the distributed fabric system, and for displaying the topology and/or the statistics in a user interface.
Figure 7B:
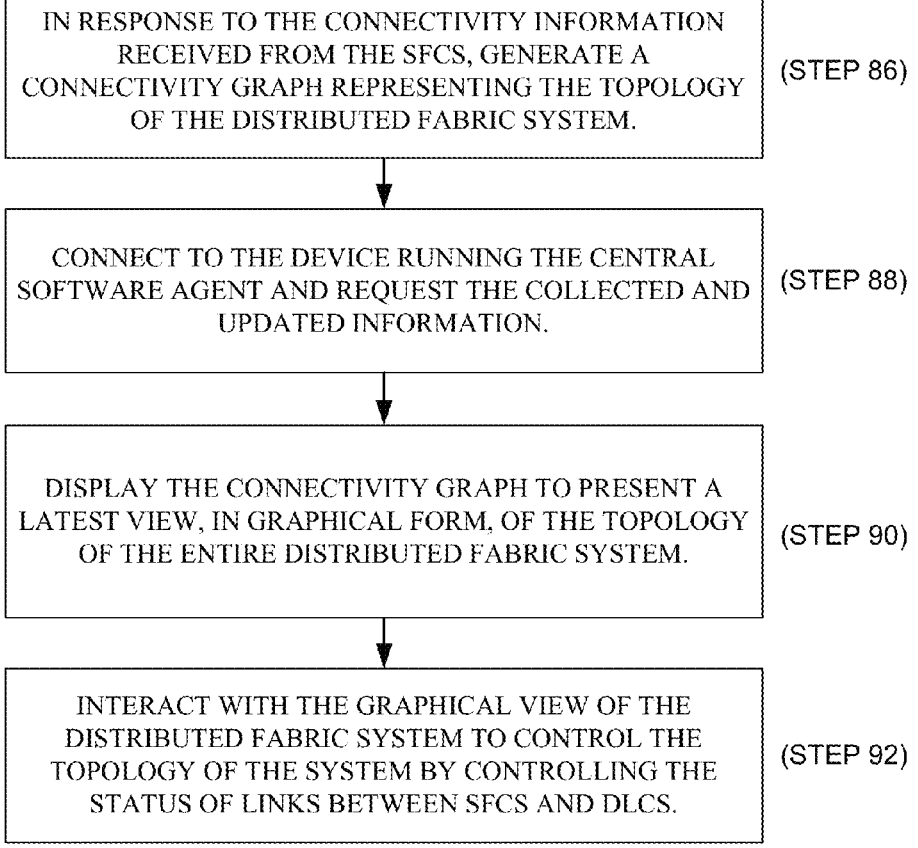

FIG. 7A and FIG. 7B show an embodiment of a process 70 for developing a topology of the distributed fabric system and for diagnosing the distributed fabric system. Although described in connection with a single fabric element chip, it is to be understood that each chip performs the process 70 during operation of the distributed fabric system. The fabric element chip 16 of the SFC 12 detects (step 72) the connectivity between the fabric elements and the fabric interfaces of the switching chips on the DLCs. To detect the connectivity, the fabric element chip 16 of an SFC 12 exchanges highest priority reachability messages on all of its SerDes links 26 to learn the Device ID of each switching chip (i.e., network processor 22) to which that SFC 12 is connected. After multiple iterations of message exchanges, the fabric element chip 16 generates (step 74) a table containing information representing the reachability of target device on the SerDes links of that SFC. A table is an example of a data structure that can serve to hold the collected information. Through various mechanisms, the fabric element chip 16 builds the topology matrix of individual lanes and their connectivity. As an example of one such mechanism, the logic of the fabric element chip 16 and the logic of the fabric interface of the switching chip exchange control cells over all the SerDes links. Each control cell contains details of the source device. By learning the source device ids, these fabric element chips build topology tables per lane. Then, by finding all lanes having the same peer device ids, the logic of the fabric element chips builds device-level topologies. In addition, the fabric element chip 16 updates the table frequently (e.g., every 6 microseconds). The update frequency ensures the precision and reliability of the information.

The fabric element chip 16 can also collect (step 76) per-lane statistics about the health, usage, errors, bandwidth of individual lanes of each SFC fabric port 18. Individual lane statistics collected during a collection period include, but are not limited to, total cells received, total cells transmitted, total unicast cells, total multicast cells, total broadcast cells, total number of control cells of various types, statistics per priority queues (e.g., priority levels 0 through 7). Error statistics for individual lanes during a measurement period include, but are not limited to, cell errors received, cell errors transmitted, PLL (phase-locked loop) errors, cell header errors on received cells, various types of local buffer overflows, 1-bit parity errors, and multiple bit parity errors. The fabric element chip 16 stores the collected statistics in the memory (e.g., in table form with or separate from topology information). The fabric element chip 16 can also perform per-lane diagnostics, such as tuning and testing the analog-signal attributes (e.g., amplitude and signal pre-emphasis) of each lane.

For example, the per-lane diagnostics can include setting of Pseudo Random Bit Sequence (PRBS) to various modes (e.g., PRBS31, PRBS23, PRBS11, PRBS9 and PRBS7). By setting each of these modes at both ends of a lane, the diagnostics module can identify and tune per-lane pattern susceptibility.

In addition, the diagnostics module can measure power, in milliwatts, consumed for various data rates on each lane. By measuring the amount of power consumed per lane, power consumption for a given SFC or DLC fabric port can be determined. Other diagnostics can include collecting rise and fall time (i.e., called signal edge rates) for each lane by reading lane registers. Such diagnostics provide a per-lane attribute of serial switching performance.

As another example of a diagnostic that can be performed, a fabric element chip can read the "unit or bit interval" for each lane. A unit interval or bit interval is a measure of time allocated for one bit at a given data rate (e.g., 10.3 Gbps lane has a bit interval equal to 97.08 picoseconds). For each fabric port, the average bit interval is calculated and presented for performance evaluation and tuning.

The diagnostics module can also perform jitter simulation for each lane, adding various quantities of jitter to the lane and determining a per-lane tolerance of the switch fabric and of the DLC. Similar testing for the reference clock jitter can be performed for tolerance calibration.

As an example of tuning, the diagnostics module can tune settings for the setup and hold times for each fabric port in order to stabilize the parallel data bus for clocking into a parallel register. Another example of tuning involves setting the encoding for each lane (e.g., 64/66b, 8/10b), which affects the ability of the lane to identify parity and rectify errors. The diagnostic module can also tune SerDes lanes to be efficient when carrying consecutive identical patterns (e.g., 00000000000000 or 11111111111111111) without losing the data clock.

Concurrent with the operation of the SFC fabric element chip 16, the DLC fabric interface 32 of the network processor chip 22 also collects (step 78) per-lane statistics of cells received or transmitted, including error statistics, over each communication link 26.

Through the API layer 30 of the SDK 31, the local software agent 28 running on the SFC chassis 12 can access (step 80) those connectivity tables produced by the fabric element chip 16 and the individual lane statistics collected by the fabric element chip 16. Similarly, through the SDK 50 and API layer 52, the local software agent 54 running on the DLC 14 accesses (step 82) the individual lane statistics collected by fabric interface 32 of the network processor chip 22. The collection of the information by the local software agents 28, 54 can occur at predefined or dynamically set intervals.

The local software agents 28, 54 running on the SFC 12 and DLC 14, respectively, forward (step 84) the connectivity and statistics information to the central software agent 56 that is running on the master DLC (or, alternatively, on a server (e.g., server 6) connected to the data center). This information is for building the topology of the distributed fabric system and to provide, on demand, detailed statistics of every lane on all the ports.

In response to the connectivity information received from the SFCs, the central software agent 56 generates (step 86) a connectivity graph representing the topology of the distributed fabric system. This graph precisely depicts all the DLCs and SFCs in the distributed fabric system with their interconnectivity. In addition to the topological information and various cell statistics for each lane, the central software agent 56 has the bandwidth of the links, oversubscription factors, traffic distribution, and other details. The connectivity graph can also show the bandwidth (and/or such other information) of all the interconnected links 26. Further, because the fabric element chips 16 update their connectivity matrix with high frequency, the central software agent 56 can frequently update the global connectivity topology of the distributed fabric system to show the link status (for example) along with the changes in the topology.

A network administrator from the management station 4 can connect (step 88) to the device running the central software agent 56 and request the collected and updated information. In response to the request, a GUI-based application running on the management station 4 displays (step 90) the connectivity graph to present a latest view, in graphical form, of the topology of the entire distributed fabric system. The latest view can include the bandwidth and link status of each communication link 26 between each SFC and each DLC.

The graphical view of the entire network topology of the complex distributed network system advantageously facilitates management of the distributed fabric system, fault diagnoses, and debugging. A network administrator can interact (step 92) with the graphical view of the distributed fabric system to control the topology of the system by controlling the status of links between SFCs and DLCs. The on-demand display of the statistics on a per lane, per SFC fabric port, per DLC basis with respect to each SFC and individual fabric element chips simplifies the troubleshooting of problems that arise in the distributed fabric system by pinpointing the affected links.

Figure 8:
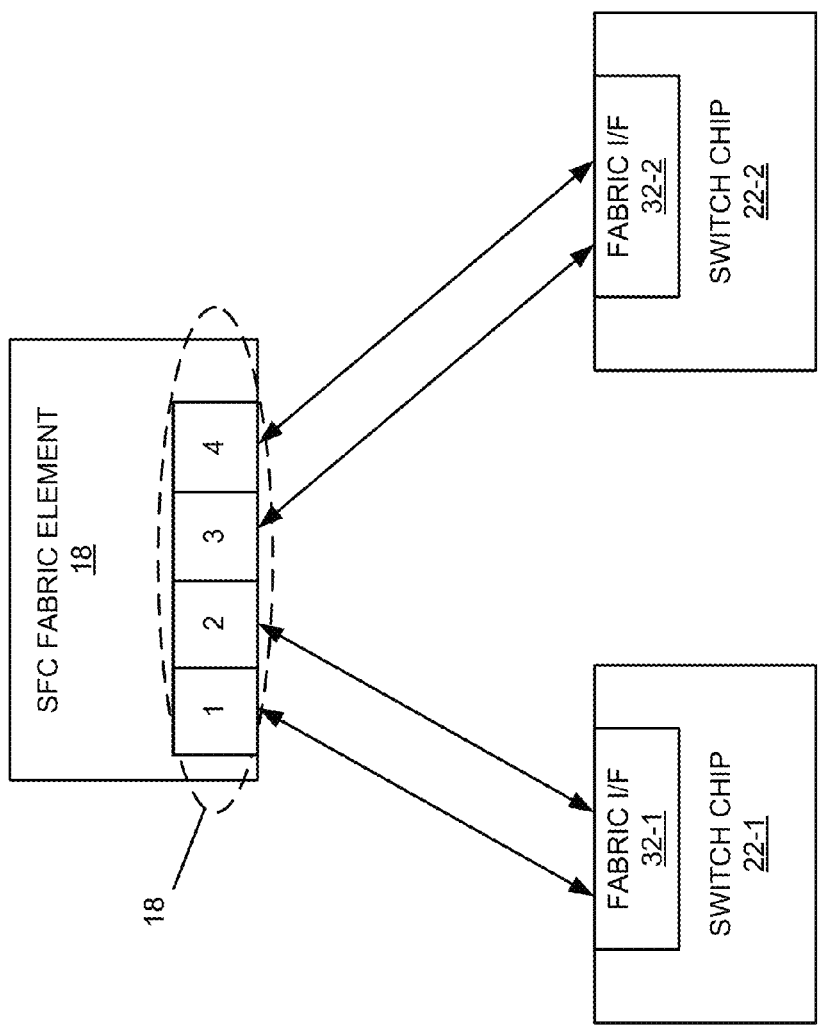
FIG. 8 is a block diagram of an example topology for a simplified distributed fabric system.

FIG. 8 is a block diagram of an example simplified topology for a distributed fabric system comprised of a fabric element chip 16 and two network processor chips 22-1, 22-2. For purposes of illustration, the two network processor chips 22-1, 22-2 reside in separate DLC chassis. In this example, the SFC fabric ports 18-1, 18-2 are connected to fabric interface 32-1 of the network processor chip 22-1 and the SFC fabric ports 18-3, 18-4 are connected to fabric interface 32-2 of the network processor chip 22-2 by communication links 26. Table 1 is a simplified example of a table that the SFC fabric element chip 16 might produce based on reachability messages exchanged by the fabric element chip 16 and the fabric interfaces 32-1, 32-2.

TABLE 1

| Target Switch Device ID | Local SerDes ID | SerDes Link State | SerDes Link speed |
| --- | --- | --- | --- |
| 0 | 0 | Up | 10.3 Gbps |
| 0 | 1 | Up | 10.3 Gbps |
| 1 | 2 | Up | 24 Gbps |
| 1 | 3 | Down | 24 Gbps |

As described previously, this mapped information can be accessed through the SDK 31 and API layer 30 of the fabric element chip 16 and used to construct and display a graph representing the topology of the distributed fabric system, along with the status of each link and their respective bandwidths.

Figure 9:
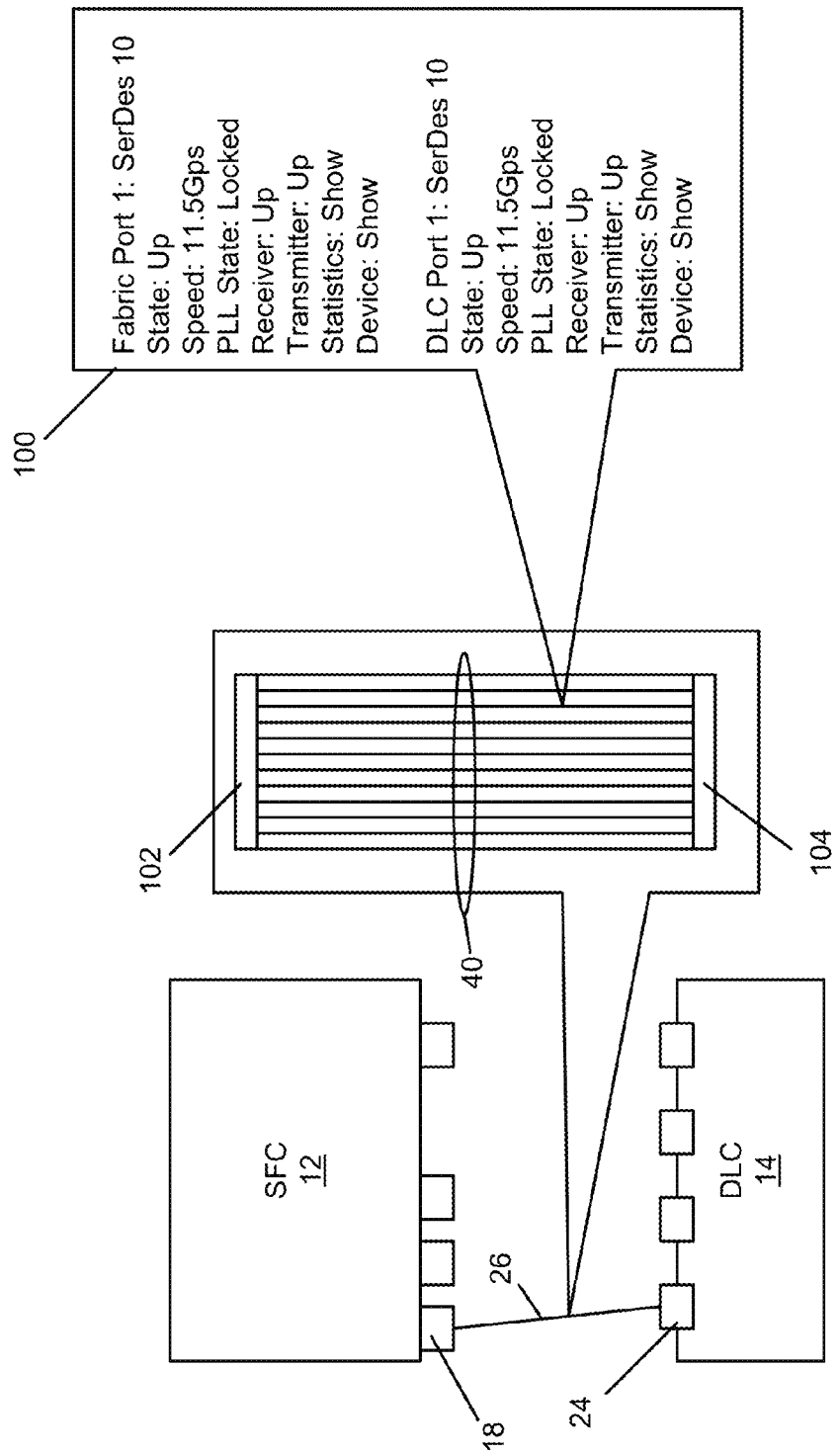
FIG. 9 is a diagram of an example of a graphical view of a link level diagnostics that can be produced by an SFC and a DLC.

FIG. 9 shows an example of a graphical view 100 of link level diagnostics that can be produced by the SFC 12 and the DLC 14 based on their monitoring of the communication link 26 between a given SFC fabric port 18 and a given DLC fabric port 24. As shown, the communication link 26 is comprised of twelve SERDES channels 40 between the SFC connector 102 and the DLC connector 104. In this example, the graphical view 100 is specific to SERDES 10 (for illustration purposes, counting from the leftmost SERDES channel 40). Information produced by for the SFC and DLC fabric ports 18, 24 include the identification of the port and SERDES channel, the state of the port, the speed of the SERDES channel, the phase locked loop state, the states of the receiver and transmitter, and the display states for the statistics and the device. The displayed information is for example purposes only; other embodiments can include different information and use a different display format than that shown.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A computer program product for managing a distributed fabric system in which at least one scaled-out fabric coupler (SFC) chassis is connected to at least one distributed line card (DLC) chassis over fabric communication links, each fabric communication link connecting one fabric port of the at least one SFC chassis to one fabric port of the at least one DLC chassis, each fabric communication link including a plurality of lanes by which to carry cells, the computer program product comprising:
a non-transitory computer-readable storage medium having computer-readable program code embodied therewith, the computer-readable program code comprising:
computer-readable program code configured to collect, by each fabric element chip of each SFC chassis, per-lane statistics for each SFC fabric port of that SFC chassis;
computer-readable program code configured to gather the per-lane statistics collected by each fabric element chip of each SFC chassis by a central agent; and
computer-readable program code configured to integrate the per-lane statistics gathered by the central agent into a topology of the entire distributed fabric system for presentation by a user interface.

2. The computer program product of claim 1, further comprising computer-readable program code configured to collect, by each fabric interface of a network processor of each DLC chassis, per-lane statistics for each DLC fabric port of that DLC chassis.

3. The computer program product of claim 2, further comprising computer-readable program code configured to gather, by the central agent, the per-lane statistics collected by each fabric interface of a network processor of each DLC chassis, and wherein the topology presented by the user interface is further integrated with the per-lane statistics collected by each fabric interface of a network processor of each DLC chassis.

4. The computer program product of claim 1, wherein the per-lane statistics include a number of cells received and a number of cells transmitted during a measurement interval.

5. The computer program product of claim 1, wherein the per-lane statistics include a count acquired during a measurement interval of one or more of the following: unicast cells received and transmitted, multicast cells received and transmitted, and broadcast cells received and transmitted.

6. The computer program product of claim 5, wherein the per-lane statistics further includes a count for each different priority level used for each type of cell during transmission and upon receipt.

7. The computer program product of claim 1, further comprising computer-readable program code configured to tune and test analog signal attributes of each lane.

8. The computer program product of claim 1, wherein the per-lane statistics include error statistics of one or more of the following: received cell errors, transmitted cell errors, PLL (phase-locked loop) errors, cell header errors on received cells, local buffer overflows of different types, 1-bit parity errors, and multiple bit parity errors.

9. The computer program product of claim 1, wherein the per-lane statistics include a count of control cells of different types during a measurement interval.

10. A distributed fabric system comprising:
at least one distributed line card (DLC) chassis, each DLC chassis including at least one network processor and a plurality of DLC fabric ports, each network processor of each DLC chassis including a fabric interface in communication with the DLC fabric ports of that DLC chassis;
at least one scaled-out fabric coupler (SFC) chassis, each SFC chassis including a fabric element chip and a plurality of SFC fabric ports, each SFC fabric port being connected to one of the DLC fabric ports by a fabric communication link, each fabric communication link including a plurality of lanes by which to carry cells,
each fabric element chip of each SFC chassis collecting per-lane statistics for each SFC fabric port of that SFC chassis, each SFC chassis further including a processor and memory storing program code configured to obtain, when executed, the per-lane statistics collected by the fabric element chip of that SFC chassis; and
a network element including a processor and memory storing program code configured to gather, when executed, the per-lane statistics collected by each fabric element chip of each SFC chassis and to integrate the gathered per-lane statistics into a topology of the entire distributed fabric system for presentation by a user interface.

11. The distributed fabric system of claim 10, wherein each fabric interface of a network processor of each DLC chassis collects per-lane statistics for each DLC fabric port of that DLC chassis.

12. The distributed fabric system of claim 11, wherein each fabric element chip of each SFC chassis and each fabric interface of a network processor of each DLC chassis tunes and tests analog signal attributes of each lane.

13. The distributed fabric system of claim 11, wherein the central agent gathers the per-lane statistics collected by each fabric interface of a network processor of each DLC chassis, and wherein the topology presented by the user interface is further integrated with the per-lane statistics collected by each fabric interface of a network processor of each DLC chassis.

14. The distributed fabric system of claim 10, wherein the per-lane statistics include a number of cells received and a number of cells transmitted during a measurement interval.

15. The distributed fabric system of claim 10, wherein the per-lane statistics include a count acquired during a measurement interval of one or more of the following: unicast cells received and transmitted, multicast cells received and transmitted, broadcast cells received and transmitted, and control cells of different types during a measurement interval.

16. The distributed fabric system of claim 15, wherein the per-lane statistics further includes a count for each different priority level used for each type of received and transmitted cell.

17. The distributed fabric system of claim 10, wherein the per-lane statistics include error statistics of one or more of the following: received cell errors, transmitted cell errors, PLL (phase-locked loop) errors, cell header errors on received cells, local buffer overflows of different types, 1-bit parity errors, and multiple bit parity errors.

18. The distributed fabric system of claim 10, wherein the per-lane statistics collected by each fabric element chip of each SFC chassis and each fabric interface of a network processor of each DLC chassis includes a cell distribution across the lanes.

19. The distributed fabric system of claim 10, wherein the per-lane statistics collected by each fabric element chip of each SFC chassis and each fabric interface of a network processor of each DLC chassis includes utilization of the fabric communication links.

* * * * *